(12) United States Patent
Tews et al.

(10) Patent No.: US 6,987,460 B2
(45) Date of Patent: Jan. 17, 2006

(54) ORIENTATION DEVICE

(75) Inventors: Erik H. Tews, Fresno, CA (US); Alex Pokrovsky, Fresno, CA (US); Thomas C. Lyon, San Jose, CA (US)

(73) Assignee: Pelco, Clovis, CA (US)

( * ) Notice: Subject to any disclaimer, the term of this patent is extended or adjusted under 35 U.S.C. 154(b) by 291 days.

(21) Appl. No.: 10/390,272

(22) Filed: Mar. 14, 2003

(65) Prior Publication Data

US 2004/0178920 A1 Sep. 16, 2004

(51) Int. Cl.
*G08B 21/00* (2006.01)

(52) U.S. Cl. ................. 340/689; 340/686.3; 340/691.1; 340/545.5; 33/366.11; 33/366.21; 33/366.23; 33/366.24; 33/315; 73/652; 73/382 R; 200/61.52; 200/61.45 R (58) Field of Classification Search ................. 340/689, 340/686.3, 691.1, 545.5; 33/366.11, 366.21, 33/366.23, 366.24, 315; 73/652, 382 R; 200/61.52, 200/61.45 R
See application file for complete search history.

(56) References Cited

U.S. PATENT DOCUMENTS

| | | | | |
|---|---|---|---|---|
| 3,681,637 | A | * | 8/1972 | Simpson ...................... 313/370 |
| 3,823,496 | A | * | 7/1974 | Querci et al. .................. 37/458 |
| 5,173,585 | A | * | 12/1992 | Dokken ....................... 219/201 |
| 5,180,986 | A | * | 1/1993 | Swartz et al. ................ 324/660 |
| 5,630,280 | A | | 5/1997 | Crossan, Jr. |
| 5,852,878 | A | | 12/1998 | Seipp, Jr. et al. |
| 6,249,984 | B1 | | 6/2001 | Barsky et al. |
| 6,453,571 | B1 | | 9/2002 | Crossan, Jr. |

OTHER PUBLICATIONS

The Fredericks Company, information from website, 19 pgs.
Omron Micro Tilt Switch brochure (4 pgs); Nov. 19, 2002.
Willow Technologies (2 pgs); brochure.
Astralux Non–Mercury Tilt Sensor brochure (4 pgs); 1998.
Comus International brochure (2 pgs); Nov. 19, 2002.
Tilt & Vibration Sensing Switches brochure (3 pgs); Mar. 14, 2003 by Signal Systems International, Inc.
Non Mercury Switches information (1 pg); Mar. 14, 2003 by Signal Systems International, Inc.
Mechanical Drawings Tilt and Vibration information sheet (2 pgs); Mar. 14, 2003 by Signal Systems International, Inc.
SCM Tilt Sensors website information (3 pgs); 2001 by Signal Systems International, Inc.

* cited by examiner

*Primary Examiner*—Tai T. Nguyen
(74) *Attorney, Agent, or Firm*—Mark D. Miller

(57) ABSTRACT

Disclosed is an orientation device that may be deployed in a mechanical assembly such as a surveillance camera or enclosure to positively determine the physical orientation and/or attitude (tilt), or any change in such physical orientation and/or attitude, of either the camera or the enclosure, and report that information electronically. The invention includes a sensor that is triggered by the movement of a weighted flag along a shaft caused by gravity or gravity in conjunction with the operation of a spring. As the invention is rotated through 360°, the force of gravity and force of the spring are exerted on the weighted flag, causing it to move along the shaft as the assembly is rotated. Each movement by the flag is detected by the sensor which sends an electronic signal indicating that a predetermined point has been reached. Multiple assemblies may be used, offset from each other, to provide additional and more precise position information.

23 Claims, 5 Drawing Sheets

HORIZONTAL

HORIZONTAL

45° TO HORIZONTAL

90° TO HORIZONTAL

INVERTED

ORIENTATION DEVICE

BACKGROUND OF THE INVENTION

1. Field of the Invention

The present invention is an orientation device (tilt switch) for use in the closed circuit television (CCTV) industry to positively resolve the physical orientation of a mechanical assembly, particularly surveillance cameras. Resolution of the physical orientation allows the operating functions of the assembly to be specifically tailored according to the orientation.

2. Description of the Prior Art

Surveillance cameras are deployed in a wide variety of enclosures and environments. In many cases, the environment will dictate the type, size and style of enclosure that is deployed. Enclosures deployed indoors are often ceiling, wall or floor mounted, and typically include a transparent dome that surrounds the surveillance camera. These enclosures may not require the environmental protections called for in outdoor or industrial deployments. Enclosures deployed outdoors or in industrial environments may be exposed to significant changes in temperature, air pressure and humidity as well as moisture (precipitation, condensation or frost), dust, debris, corrosives and other foreign material. The enclosures exposed to such conditions must be rugged, and are often equipped with such features as waterproof seals, precipitation resistant housings, ventilation and blower mechanisms, defrosting heaters, and the like. Such enclosures may be mounted on surfaces such as walls, ceilings, soffits or floors or may be attached to other structures such as poles, eaves or beams.

A given enclosure may be available for either indoor or outdoor deployment and may include many of the environmental control functions as standard features. Problems have been encountered with regard to the use of heaters in surveillance camera enclosures because of the different potential orientations of the enclosures. Heaters are useful for defrosting or defogging the transparent portions of surveillance camera enclosures. Since heat naturally rises, a heater provided inside a dome-shaped enclosure will have a different effect if the enclosure is deployed such that it hangs from a ceiling, as compared to the same enclosure deployed on a floor or on top of a flat surface.

In particular, when a heater is activated on a ceiling-mounted domed enclosure, much of the heat will rise and escape from the enclosure with very little heat actually reaching the dome. By contrast, when a heater is activated on a floor-mounted domed enclosure, much of the heat will collect inside the dome itself. Accordingly, on the ceiling-mounted enclosure, it may be necessary to operate the heater longer or at a higher temperature in order to heat the dome; whereas, on the floor-mounted enclosure much less heat and/or lower temperatures are required. If excessive heat is provided on the ceiling-mounted enclosure, the camera electronics could overheat affecting the camera performance. If excessive heat is provided on the floor-mounted enclosure, the upper portion of the transparent dome may deform, melt, or be otherwise affected interfering with and impairing the ability of the camera to obtain clear images through that part of the dome. Different degrees of these same problems are encountered with wall-mounted enclosures and with non-dome enclosures where excessive heat may collect in the upper regions of the enclosure potentially overheating the electronics or causing deforming and impairment of the optics.

Aside from heating, other environmental controls as well as camera movements and operations may also be tailored to the known positioning and orientation of the surveillance camera enclosure. In this regard, the orientation of the enclosure is also important in order to know its relationship to the ground (gravity), its position on the compass (north/south/east/west) and its position in relation to the sun.

A number of different tilt switches are known in the art. The most well known are those that use mercury that has been encapsulated inside an enclosure. Such enclosures typically have two or more electronic leads that extend into the enclosure. The liquid mercury inside the capsule moves when the enclosure is tilted. When tilted such that the mercury covers both leads, an electronic connection is made. When the enclosure is tilted in another direction, the mercury moves off one or both of the leads such that no electronic connection is made. Since mercury is a highly toxic material, mercury-based tilt switches are disfavored because of the dangers associated with any rupture of the capsule containing the mercury. Such liquid-based switches also suffer from the drawback of providing potentially erroneous information if the switch is suddenly struck or jarred.

Other known tilt switches utilize one or more balls or ball bearings disposed inside a funnel shaped housing. When the funnel is pointing down, the ball settles into the cone of the funnel where it is used to complete a circuit. When the funnel is tilted, eventually an angle is reached where the ball rolls out of the cone and disconnects the circuit. However, ball and funnel based tilt switches are expensive and not readily adaptable for wide ranging uses.

Accelerometers are also known to exist. These devices are used to measure and transmit information regarding the gravitational ("g") forces encountered by an object. Many accelerometers utilize a spring and weight mechanism. When g forces are applied to the accelerometer, the weight compresses the spring in accordance with the amount of force applied, and this is reported electronically. Accelerometers are useful for measuring one-time events such as the dropping of an object during shipping, but are not capable of determining the angle to which an object has been tilted.

It is therefore desirable to provide a mechanism by which the orientation of a surveillance camera and/or enclosure may be determined so that appropriate instructions may be provided or programmed into the camera electronics based on the orientation in order to provide improved responses to different environmental conditions and to provide improved camera operation.

SUMMARY OF THE INVENTION

The present invention is a spring-based orientation device that may be deployed in a surveillance camera enclosure to positively determine the physical orientation and/or attitude (tilt), or any change in physical orientation and/or attitude of either the camera or the enclosure, or both, and report that information electronically. Separate devices may be employed on the camera and the enclosure, respectively, to provide independent orientation information for each of the camera and the enclosure, and for comparing each such orientation information to the other. Multiple devices may also be used, deployed at measured offsets from each other, to provide additional orientation information for different angles, ranges or degrees of movement of either the camera, the enclosure or both. Such use of multiple devices provides more precise orientation information.

A very simple exemplary embodiment of the orientation device of the present invention is in the form of a tilt switch which serves to open or close an electronic circuit based on the orientation of the switch relative to a given angle. It is to be appreciated that the design parameters may be varied to affect the angle at which the tilt switch will open or close the circuit, so that the switch may be opened or closed if moved, for example, relative to horizontal, relative to vertical, or relative to any other selected angle.

This simple embodiment of the tilt switch of the present invention includes a sensor that may be triggered by the movement of a weighted flag caused by gravity. The sensor may be in the form of an optical, electromagnetic or other sensor. A specially weighted flag is slidably or movably mounted on a shaft or other suitable structure adjacent to the sensor and attached to a carefully calibrated compression spring provided with the shaft or other structure. As this assembly (sensor, flag, shaft and spring) is rotated through 360°, the force of gravity and force of the spring are exerted on the weighted sensor. The combination of these forces causes the weighted flag to move along the shaft as the assembly is rotated. Depending upon the weight of the flag and the strength of the spring, at some point during the rotation, the weighted flag will move along the shaft (e.g., from one end of the shaft to the other), and at another point the weighted flag will move back. Each of these movements by the flag is detected by the sensor which sends an electronic signal indicating that one of the crossover points has been reached. The assembly is designed to be attached to either the camera or the camera housing, and provides position information about the housing it is attached to.

By way of example only and without limiting any of the appended claims, the initial position of the sensor, flag, shaft and spring assembly may be, for example, pointing straight up (vertical=0°). At this position, the force of gravity is greater than the strength of the spring so that, in this example, the flag is at a first position on the shaft. The assembly is then rotated in either a clockwise or counter-clockwise direction. As the assembly rotates through 90°, the force of the spring is sufficient to overcome gravity, and the spring pushes the flag to a second position on the shaft. The movement of the flag at this crossover point is detected by the sensor which sends a signal that the flag has moved. This signal tells the electronics that the assembly has moved at least 90° from vertical. As the assembly rotates through 180° the spring and gravity are working together so there is no movement. Then, as the assembly rotates through 270°, the force of gravity again overcomes the spring causing the flag to move back to the first position on the shaft. The movement of the flag at this crossover point is again detected by the sensor which sends a different signal that the flag has moved back. This signal tells the electronics that the assembly has moved back to within 90° from vertical. By keeping track of these signals, the general position of the assembly (generally pointing up or down) can be known.

In this example, the weight of the flag is approximately 2.5 times greater than the weight required to compress the spring when the assembly is oriented in the vertical (0°) position. This relationship insures that the sensor is not activated in this orientation. When the assembly is moved 90° to horizontal, the restoring force in the compression spring is sufficient to move the flag to the position where it will activate the sensor (e.g., block an optical path, interrupt an electromagnetic field, etc.).

In the above example, the tilt switch is able to confirm only whether the assembly (attached to the camera or enclosure) is within the upper 180° or the lower 180° of rotation (i.e., generally pointing upward or downward). In many cases, this is sufficient information for implementing environmental and operational controls:

| Degree of rotation: | Sensor Reading |
|---|---|
| 0°–90° | off |
| 90°–180° | on |
| 180°–270° | on |
| 270°–360° | off |

Multiple assemblies may be attached to the camera or enclosure at different angles relative to each other in order to provide additional orientation information as the camera or enclosure is rotated. For example, if two of the above exemplary assemblies are attached to the camera at an offset of 90° from each other, then it can be determined from the signals generated by the two assemblies which quadrant (90° range) of rotation the camera is in:

| Degree of rotation: | First Sensor | Second Sensor |
|---|---|---|
| 0°–90° | off | on |
| 90°–180° | on | on |
| 180°–270° | on | off |
| 270°–360° | off | off |

Figure 9:
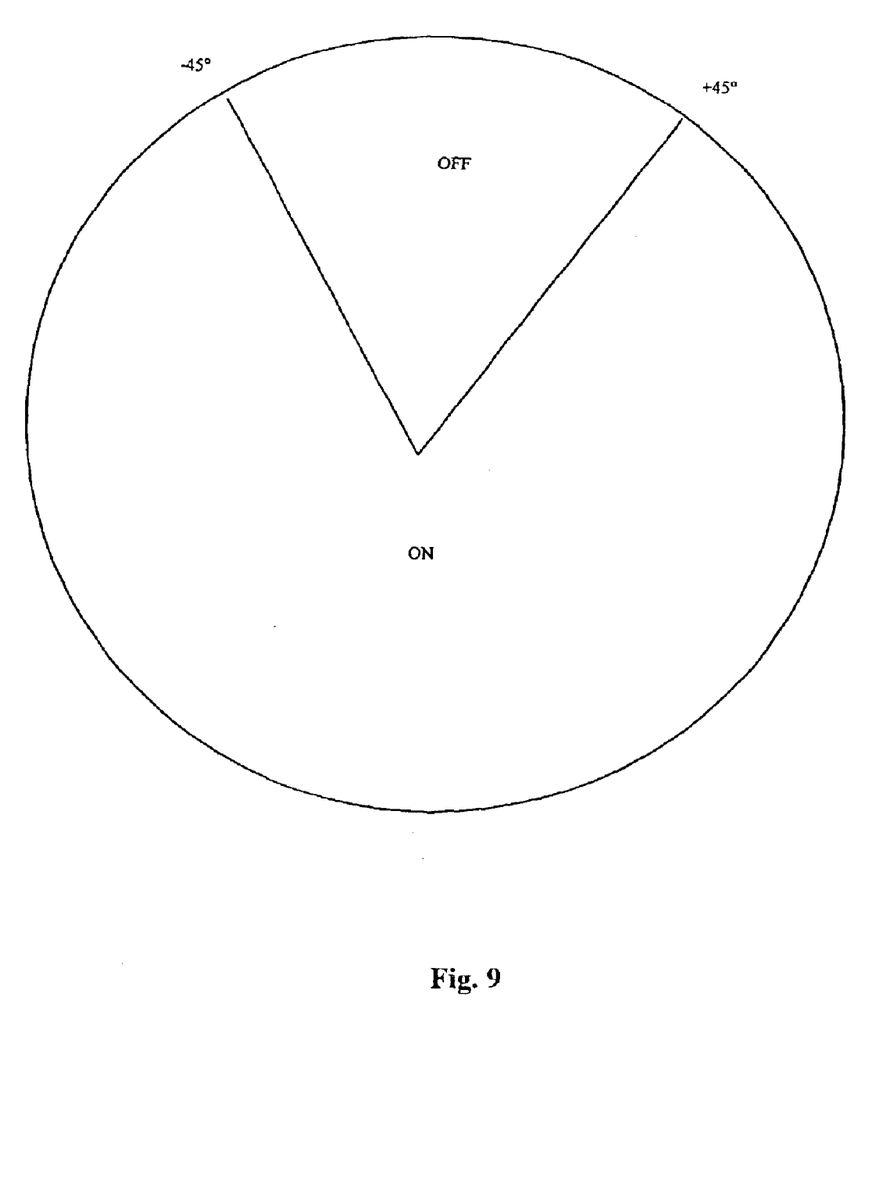
FIG. 9 is a rotational chart showing crossover points at 45° and 315°.

By carefully adjusting the weight of the flag and the strength of the spring, different crossover points (angles) may be established providing different position information for the assembly. For example, a stronger spring may overcome gravity in the first 45° of rotation, pushing the flag and triggering the sensor at the 45° angle instead of at 90°. Similarly, this same spring is only overcome by gravity (moving the flag back) in the last 45° of rotation such that the second crossover occurs at 315°. In this example, it is only known whether the assembly is within 45° either side of vertical (the uppermost 90° of rotation) or outside of this range. See FIG. 9. The specific behavior is influenced by the manufacturing tolerances of the compression spring and flag weight. It is to be appreciated that the flag weight and spring strength relationship may be reconfigured in an infinite number of ways to gain the required characteristics as needed.

It is therefore a primary object of the present invention to provide a mechanism for positively determining the physical orientation and/or attitude, or any change in physical orientation and/or attitude, of a mechanical assembly such as surveillance camera or enclosure, and to report that information electronically.

It is also an important object of the present invention to provide a mechanism for use with surveillance cameras or enclosures that may be deployed in any of a number of different positions for positively determining the physical orientation of such a camera or enclosure once it is deployed.

It is also an important object of the present invention to provide a simple, efficient, reliable and low-cost mechanism that may be attached to a surveillance camera or enclosure for positively determining the physical orientation of such camera or enclosure, and reporting that information electronically.

It is also an important object of the present invention to provide a mechanism for use with a surveillance camera or enclosure for positively determining the physical orientation of the camera or enclosure so that any defrosting heater(s) associated with the camera or enclosure may be operated in accordance with such physical orientation.

It is also an important object of the present invention to provide a mechanism for use with a surveillance camera or enclosure for positively determining the physical orientation of the camera or enclosure for automatic correction of such things as pan left/pan right, and tilt up/tilt down when the camera or enclosure is mounted in an unusual or inverted position.

It is also an important object of the present invention to provide a mechanism for use with a surveillance camera or enclosure for positively determining the physical orientation of the camera or enclosure for automatically reversing (inverting) the image received from the camera when the camera or enclosure is mounted in an inverted position.

It is also an important object of the present invention to provide a mechanism for use with a surveillance camera or enclosure for positively determining the physical orientation of the camera or enclosure for automatically counterbalancing the pan and tilt functions according to such orientation as the camera and/or enclosure is moved.

It is another object of the present invention to provide a plurality of mechanisms for use with a mechanical assembly that are deployed at offsets from each other for more precisely and positively determining the physical orientation of assembly.

DETAILED DESCRIPTION OF A PREFERRED EMBODIMENT

Referring to the drawings wherein like reference characters designate like or corresponding parts throughout the several views, and referring particularly to FIGS. 1–7, it is seen that the present invention includes a base 20 having an elongated shaft 21 and a sensor 35 attached thereto in close proximity to each other. Screws, threaded fasteners or other suitable attachment means 22 are provided to attach shaft 21 to base 20. A flag weight 25 is provided having an opening 26 for receiving said shaft 21 for slidable engagement therewith. Flag weight 25 is sized such that it includes a section or extension (the flag) 24 that is capable of activating the sensor 35. A biasing means such as a compression spring 29 is provided on shaft 21 attached to the flag weight 25.

In the embodiment illustrated in FIGS. 1–5, sensor 35 is an optical sensor, and the movement of flag weight 25 into or out of the optical path of said sensor causes it to be activated. A first signal (e.g., off) is sent when the emitter/collector optical path is blocked or interrupted, and a second signal (e.g., on) is sent when the path is not blocked.

Figure 1:
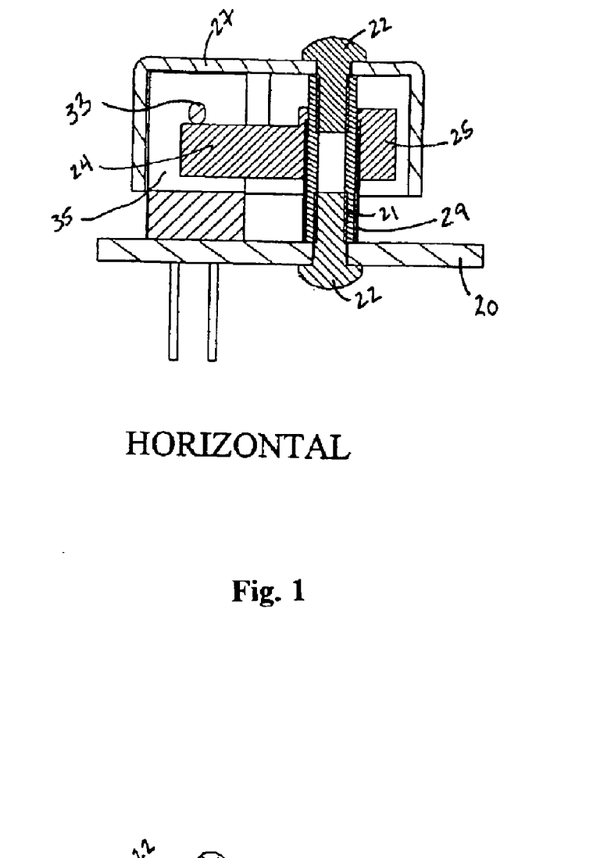
FIG. 1 is side sectional view of an embodiment of the invention using an optical sensor, the invention being oriented in a horizontal position.
Figure 2:
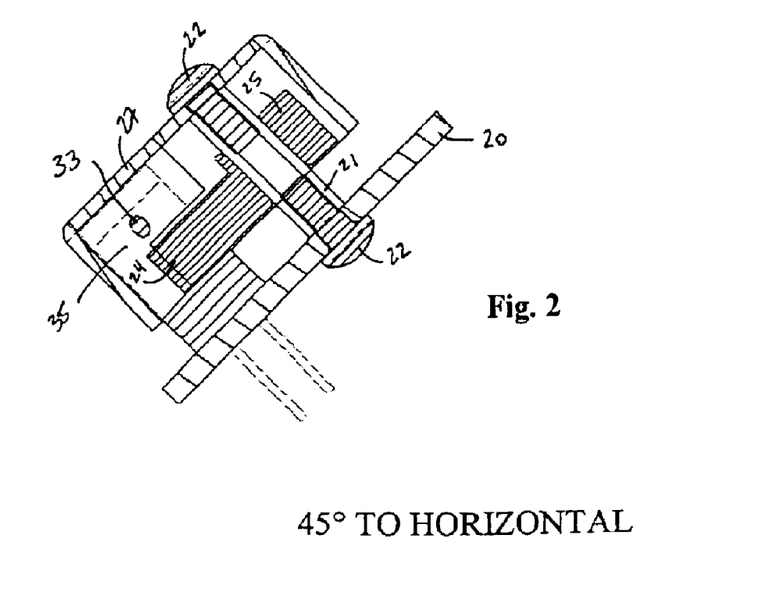
FIG. 2 is a side sectional view of the embodiment of FIG. 1 showing the invention rotated 45° from the horizontal.
Figure 3:
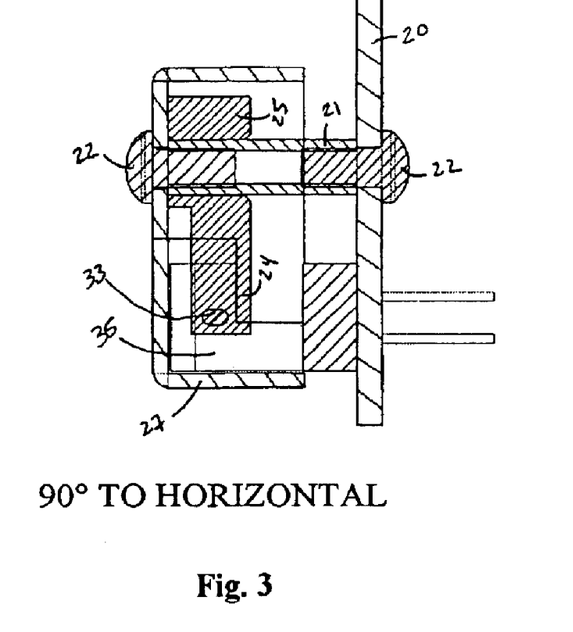
FIG. 3 is a side sectional view of the embodiment of FIG. 1 showing the invention rotated 90° from the horizontal.
Figure 4:
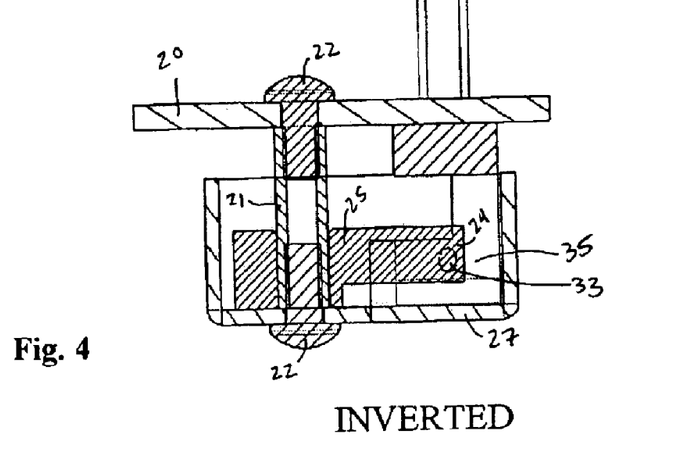
FIG. 4 is a side sectional view of the embodiment of FIG. 1 showing the invention rotated 180° from the horizontal (inverted).
Figure 5:
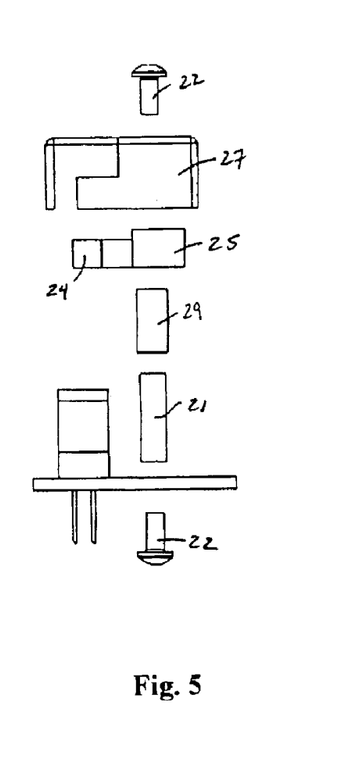
FIG. 5 is a side exploded view of the components of the embodiment of FIG. 1.
Figure 6:
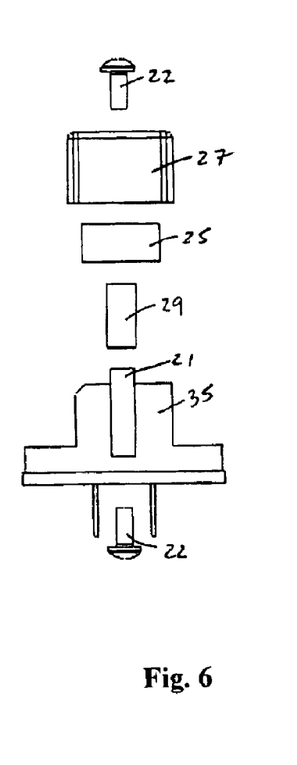
FIG. 6 is a back exploded view of the components of the embodiment of FIG. 1.
Figure 7:
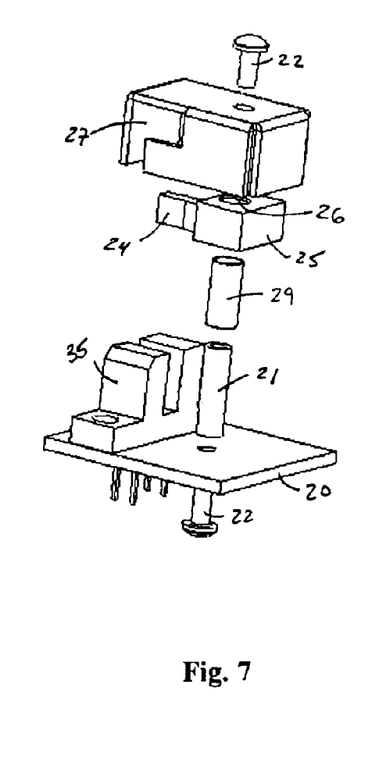
FIG. 7 is a perspective exploded view of the components of the embodiment of FIG. 1.
Figure 8:
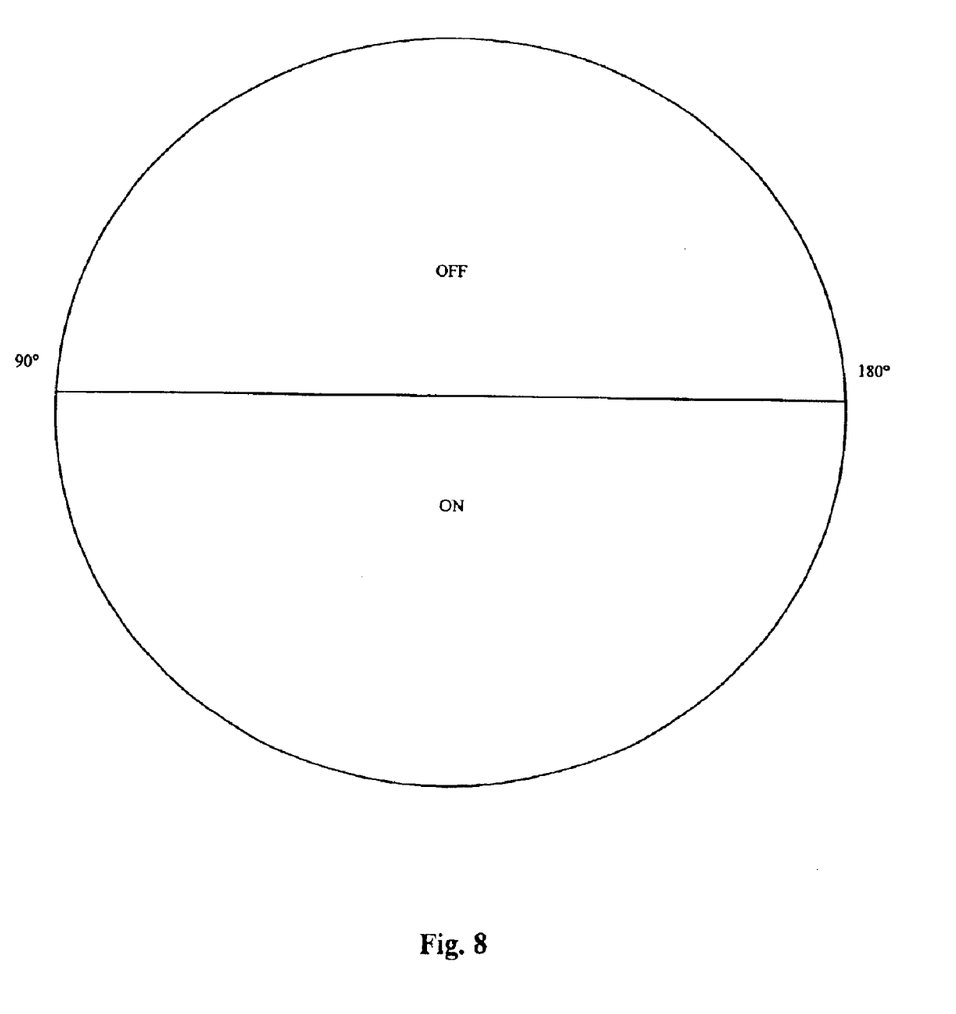
FIG. 8 is a rotational chart showing crossover points at 90° and 270°.

When in the upright position shown in FIG. 1, flag weight 25 compresses spring 29 which opens (i.e., does not block) the optical path 33 of the emitter/collector of the optical sensor 35, and the circuit is closed (off). When positioned at 90° to horizontal as shown in FIG. 3, spring 29 restores flag weight 25 to a position where flag 24 blocks the path 33 of the emitter/collector of the optical sensor 35, creating an open circuit (on). When in the inverted position of FIG. 4, flag 24 also blocks the path of the emitter/collector. When positioned at angles up to 45° from horizontal as shown in FIG. 2, the spring 29 counterbalances the flag weight 25 at a position where flag 24 does not block the optical path 33, and the circuit is closed (off). A shroud 27 may be provided to prevent wires or other hardware from interfering with the movement of the flag weight or compression spring, or entering the path 33 of the optical sensor.

It is to be appreciated that any suitable sensor 35 may be utilized including without limitation an electromagnetic sensor, a motion sensor, a touch sensor, etc. Alternatively, shaft 21 may be non-conductive, and flag weight 25, extension 24, and spring 29 may be made of conductive material such that when flag weight is moved to one end of shaft 21 it closes a circuit, but when moved to the other end opens said circuit. In a variation of this alternative embodiment, shaft 21 may also be conductive. In another variation, there may be multiple positions (leads) along shaft 21 where one or more circuits are closed as conductive flag 25 and extension 24 move so as to touch the corresponding lead(s). In yet another variation, spring 29 may be eliminated so that the movement of conductive flag weight 25 and extension 24 is governed only by gravitational forces. It is to be appreciated that any combination of these variations may be utilized, depending upon the circumstances and the desired results.

In another embodiment flag weight 25 and/or extension 24 may be made of a magnetically affected metal such as iron or steel, and the biasing means 29 may be in the form of a magnet, magnets or electromagnet(s) having forces which work with or against the force of gravity. In this embodiment, different combinations of weights for flag weight 25 and/or extension 24 and different magnetic strengths for biasing means 29 may be employed to obtain crossover points at different angles or positions.

As part of a camera system, the present invention allows for a multi dimensional attitude sensing device. The present invention allows for specialized programming aspects of operation of surveillance camera circuits, dome systems and camera movements. For example, surveillance cameras and scanners can utilize the attitude sensing device of the present invention in a manner designed to reverse the relationship of pan left, pan right, tilt up, tilt down when the unit is mounted in an inverted position, thus eliminating the need to customize the controls for the correct reference to the pan/tilt directions. The attitude sensing device can be used to effect any servo-loop compensation system used to position an enclosure by influencing the torque required to counterbalance the enclosure during pan or tilt motions in a manner relative to the enclosures mounted orientation. The attitude sensing device can also be used to correct the orientation of a cameras image in relationship to the cameras orientation, in other words, if the camera is mounted upside down, the tilt sensor would indicate that the image needs to reversed.

The invention can be realized as a digital device producing a monotonic detection over a range of attitudes, and also as an analog device over a range of attitudes. The digital signal can directly control process control algorithms or be inputs to another process or processor, that processor being collocated in the camera system or remotely at another control location and interfaced through a remote control signal, either as a separate remote control physical layer or one of multiplexed nature (i.e., the analog video physical layer), to control the camera or camera mount (pan, tilt and zoom—PTZ) features.

The device may be realized as an analog device to be used directly or through signal conditioning, either analog or digital. The conditioned analog signal can directly control process control algorithms or be inputs to another process or processor, that processor being collocated in the camera system or remotely at another control location and interfaced through a remote control signal, either as a separate remote control physical layer or one of multiplexed nature (i.e. the analog video physical layer), to control the camera or camera mount (PTZ) features the require incremental detection of attitude.

The function of marrying attitude control and the camera and or camera mount (PTZ) and its controls is not limited to the illustrated implementation. In this respect, any means to translate attitude information of the camera system to a control stimulus for the modification of the control stimulus of the camera or PTZ system is contemplated by this disclosure.

It is to be understood that variations, modifications and combinations of the elements of the various embodiments of the present invention may be made without departing from the scope thereof. It is also to be understood that the present invention is not to be limited by the specific embodiments disclosed herein, but only in accordance with the appended claims when read in light of the foregoing specification.

What is claimed is:

1. A device for determining the orientation of a mechanical assembly comprising:
   a. a base having at least one sensor attached thereto, said at least one sensor being capable of providing an electronic signal when it is activated;
   b. a shaft attached to said base in the near proximity of said at least one sensor;
   c. a weight slidably disposed along said shaft, said weight having an extension attached thereto that is capable of activating said at least one sensor; and
   d. a spring deployed around said shaft between said base and said weight.

2. The orientation device of claim 1 that is capable of producing a monotonic indication of system attitude, and is capable of producing a consistent response to a change in attitude in any of the group consisting of: X tilt, Y tilt, and combinations of X and Y tilt of system attitude.

3. The orientation device of claim 2 wherein the shape of the weight and extension is selected from the group consisting of rectangular, round, spherical and combinations thereof.

4. The orientation device of claim 1 wherein the position of the weight and extension along said shaft is determined as a result of the balance of said weight and extension against the force of said spring and the force of gravity.

5. The orientation device of claim 1 wherein said sensor is optical and is activated by the intervention of an object across a light beam associated with said sensor, and wherein said weight extension is capable of intervening across said light beam as it moves along said shaft.

6. The orientation device of claim 5 wherein said sensor provides an output signal when the position of said device is changed such that said weight extension crosses said light beam.

7. The orientation device of claim 5 wherein the output signal is analyzed by a processor to determine the relative attitude of the orientation device and any mechanical assembly to which it is attached.

8. The orientation device of claim 1 wherein said sensor is magnetic and is activated by the intervention of an object in a flux field associated with said sensor, and wherein said weight extension is capable of intervening into said flux field as it moves along said shaft.

9. The orientation device of claim 8 wherein said sensor provides an output signal when the position of said device is changed such that said weight extension crosses into said flux field.

10. The orientation device of claim 9 wherein the output signal is analyzed by a processor to determine the relative attitude of the orientation device and any mechanical assembly to which it is attached.

11. The orientation device of claim 1 wherein said sensor is at least one electrical contact that is closed when touched by a conductive member in a circuit, and wherein said weight extension is a conductive member in a circuit and is capable touching said at least one contact as it moves along said shaft.

12. The orientation device of claim 11 wherein said at least one contact provides an output signal when the position of said device is changed such that said weight extension touches said at least one contact.

13. The orientation device of claim 12 wherein the output signal is analyzed by a processor to determine the relative attitude of the orientation device and any mechanical assembly to which it is attached.

14. In combination, a surveillance camera and enclosure assembly, and at least one orientation device attached to said camera, said orientation device comprising:
   a. a base having at least one sensor attached thereto, said at least one sensor being capable of providing an electronic signal when it is activated;
   b. a shaft attached to said base in the near proximity of said at least one sensor;
   c. a weight slidably disposed along said shaft, said weight having an extension attached thereto that is capable of activating said at least one sensor; and
   d. a spring deployed around said shaft between said base and said weight.

15. The combination of claim 14 wherein said assembly includes at least one electronically controlled defrosting heater and wherein the operation of said heater is adjusted according to the signals received from said orientation device so as to avoid damage to the assembly optics and electronics.

16. The combination of claim 14 wherein at least one means is provided to adjust the power level input to a resistive heating element associated with the assembly, in respect to any change in attitude as it relates to the change that occurs in the convected heat transfer to the assembly dome if the heating element is operated with the assembly in an abnormal orientation.

17. The combination of claim 14 wherein said assembly includes electronically controlled pan and tilt functions and wherein the operation of said functions is adjusted according to the signals received from said orientation device.

18. The combination of claim 17 wherein the assembly movement relationships of pan left, pan right, tilt up, and tilt down are reversed when the signals received from the orientation device indicate that the assembly is mounted in an inverted position.

19. The combination of claim 14 wherein said assembly includes electronically controlled motors for performing pan and tilt functions, and wherein the signals received from the orientation device are used to position the assembly by influencing the torque required to counterbalance the assembly during pan or tilt motions in a manner relative to the assembly's mounted orientation.

20. The combination of claim 14 wherein the signals received from the orientation device are used to correct the orientation of a camera's image in relationship to the camer's orientation.

21. The combination of claim 14 wherein signals received from the orientation device are used to reverse the orientation of the image provided by the camera if the assembly is mounted upside down.

22. The combination of claim 14 wherein a plurality of said orientation devices are provided on said assembly at different offsets from each other to provide multiple signals giving a more precise indication of the position of said assembly.

23. In combination, a surveillance camera and enclosure assembly, and at least one orientation device attached to said camera, said orientation device comprising:
   a. a base having at least one sensor attached thereto, said at least one sensor being capable of providing an electronic signal when it is activated;
   b. a shaft attached to said base in the near proximity of said at least one sensor and
   c. a weight slidably disposed along said shaft, said weight having an extension attached thereto that is capable of activating said at least one sensor.

* * * * *